Dec. 5, 1939.　　　　S. H. CALDWELL　　　　2,182,279
BRAKE LEVER
Filed Sept. 23, 1937　　　　2 Sheets-Sheet 1
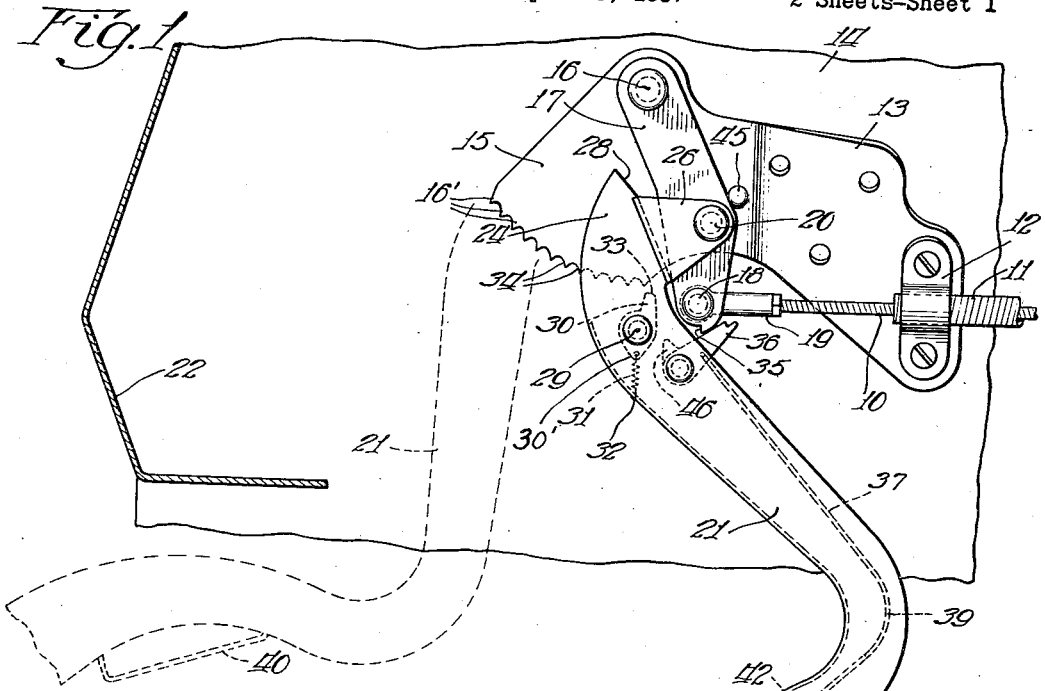
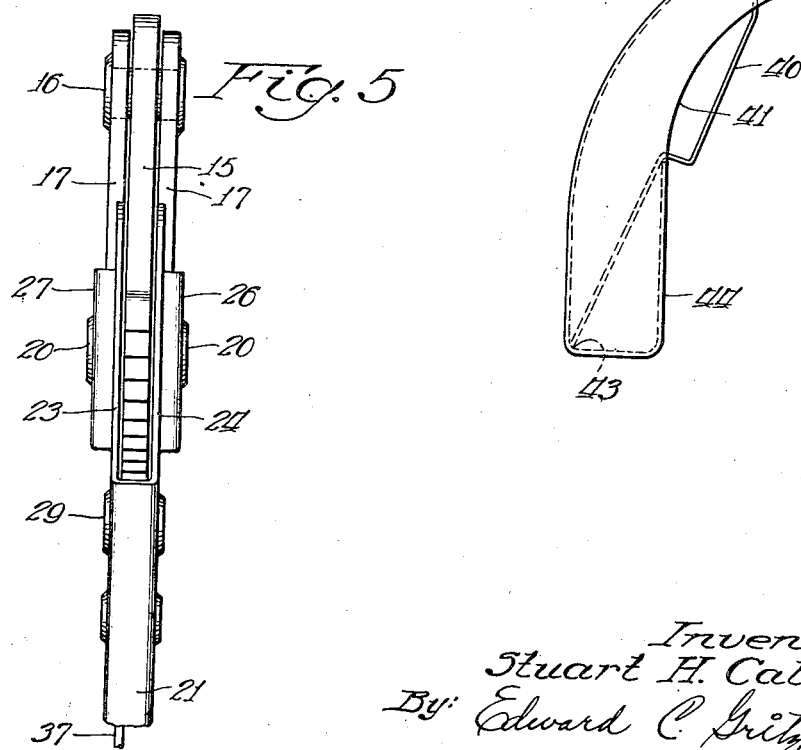
Inventor:
Stuart H. Caldwell
By: Edward C. Gritzbaugh
Atty.

Dec. 5, 1939.  S. H. CALDWELL  2,182,279
BRAKE LEVER
Filed Sept. 23, 1937   2 Sheets-Sheet 2
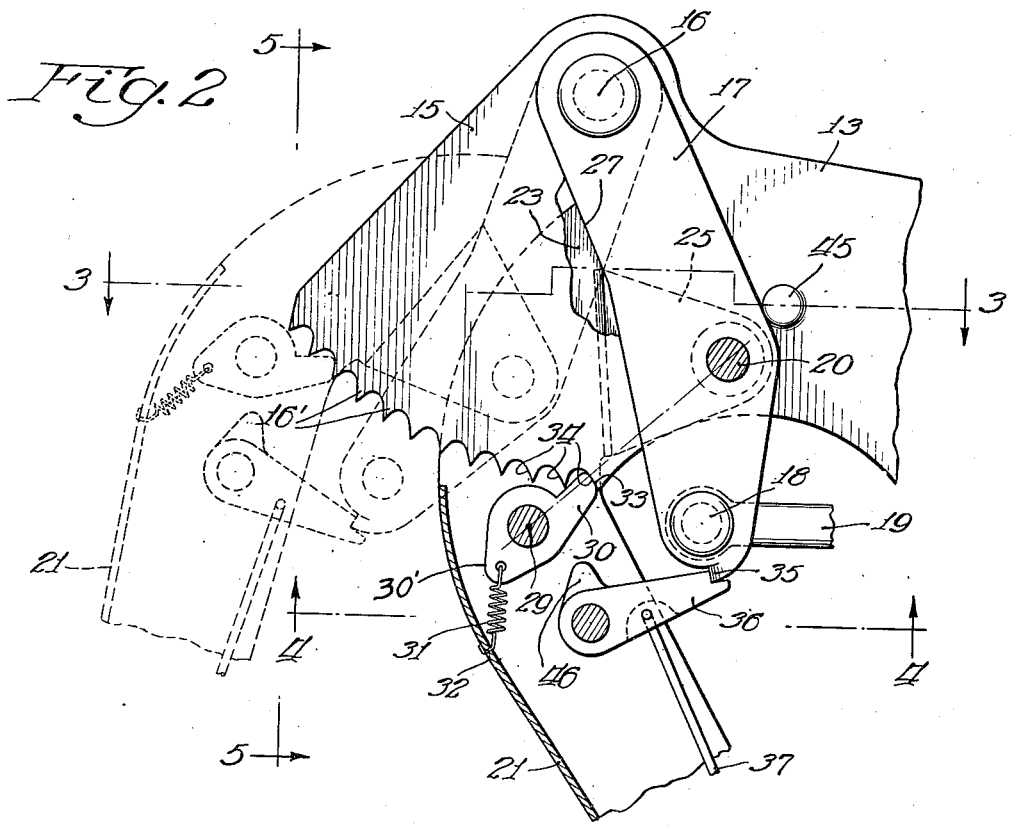
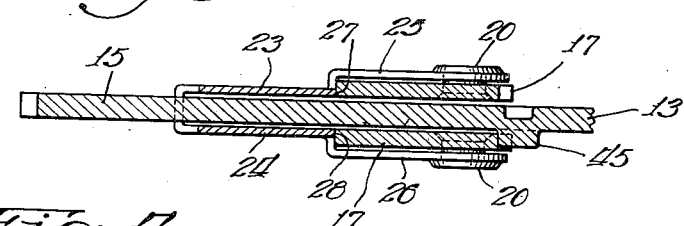
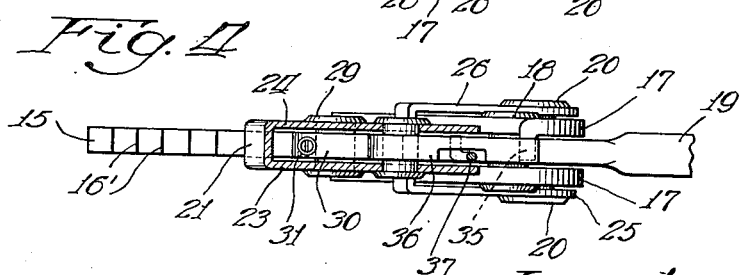
Inventor:
Stuart H. Caldwell
By: Edward C. Gritzbaugh
Atty.

Patented Dec. 5, 1939

2,182,279

UNITED STATES PATENT OFFICE 2,182,279

BRAKE LEVER

Stuart H. Caldwell, Detroit, Mich., assignor to Borg-Warner Corporation, Chicago, Ill., a corporation of Illinois Application September 23, 1937, Serial No. 165,231

5 Claims. (Cl. 74—536)

This invention relates to ratchet and pawl devices, and particularly to devices wherein the pawl is required to reciprocate over the ratchet.

Although this invention can be applied generally to all cases wherein the ratchet is fixed and the pawl is movable against a tensioning force, it will be described for purposes of illustration as applied to a brake lever for an automobile.

Emergency and parking brakes as heretofore constructed have been comprised of a long pivoted lever to which is secured the pull rod or cable of the brake, and a ratchet and pawl device for locking the lever in any desired position. The ratchet is usually in the form of a fixed segment, and the pawl is pivoted and biased by a spring into engagement with the ratchet. A button or an auxiliary lever incorporated in the handle is connected to the pawl and serves as the means for withdrawing the pawl from the ratchet to permit the brake to be released.

It is apparent that in such constructions the full force of the tension in the pull rod is exerted upon the pawl, and that its release requires an even greater pull on the lever than is necessary to apply the brakes in order to free the pawl from the ratchet. The button or auxiliary lever accordingly is operable only upon the application of a great deal of pressure, which makes the operation of the brake awkward and tiring.

The object of this invention is an improved ratchet and pawl device in which the pawl is releasable upon the application of a very small force.

Another object of this invention is a brake lever of the ratchet and pawl type in which the full tension of the brake is taken by the pawl, but which nevertheless is releasable upon the application of very slight pressure.

Another object is to provide a pawl and ratchet device in which the full actuating load cannot be imposed upon the points of the ratchet teeth.

Another object is to provide a latch mechanism for a brake in which the latch carries none of the brake tension load.

These and other objects of this invention will become apparent from the following detailed description when taken together with the accompanying drawings which form a part thereof, and in which Fig. 1 is a side elevation of a brake for an automobile in which this invention is incorporated;

Fig. 2 is an enlarged view, partly in section, of the operating mechanism, showing the lever in operative position;

Fig. 3 is a section along lines 3—3 of Fig. 2;

Fig. 4 is a section along lines 4—4 of Fig. 2; and

Fig. 5 is a front elevation of the brake of Fig. 2.

In its preferred form, this invention comprises attaching the pull rod of the brake directly or through a cable to a short lever and pivoting the hand lever and attached pawl to the short lever. Said short lever is pivoted to a bracket, and the pivot point on the bracket is the center of a segment of a ratchet which is either attached to, or formed integrally with the bracket. The pawl and ratchet are given novel forms such that the application of brake pressure causes the direction of force to be in line with the end of the pawl and its pivot. Release of the brake is accomplished by rotating the lever and its attached pawl about the short lever to disengage the pawl, and permitting the tension of the pull rod to pull the freed lever back. A latch may be provided to prevent an accidental release of the brake.

Referring now to the drawings for a more detailed description, 10 is a rod or cable which is secured to the brake operating mechanism (not shown) and is biased to the right (Fig. 2) by a spring or other means in said mechanism. Cable 10 is enclosed in a protective conduit 11 which is secured by a strap 12 to a bracket 13. Said bracket 13 is made to fit the contour of the cowl 14 or other member of the automobile to which it is secured. Although the form shown is adapted for attachment to the cowl of the automobile, it could readily be located in any other desirable place.

The rearward end of bracket 13 is formed into a segment of a ratchet 15 having teeth 15' thereon. If desired, the ratchet may be formed separately and secured to the bracket. The center of the pitch circle of the teeth is located at 16, which constitutes a pivot for a pair of short levers 17. As shown in Fig. 4, levers 17 may be in the form of a yoke which straddles bracket 13. The ends of levers 17 opposite pivot 16 are formed into a bearing 18 in which is journaled a turnbuckle 19 or other clamping device constituting the operating end of cable 10. An embossed detent 45 on bracket 13 limits the travel of levers 17 to the right, and thereby limits the return of cable 10.

It is apparent thus far that clockwise motion (Figs. 1 and 2) of levers 17 about pivot 16 causes cable 10 to be pulled to the left to operate the brake attached thereto, and that the spring tension biasing the wire to the right will tend to rotate levers 17 in a counterclockwise direction.

At some point on levers 17, which is on a shorter radius than teeth 16' of ratchet 15, are pivots 20 for a hand lever 21, which may have any desired or necessary shape to avoid other members of the automobile such as the dash board 22. Hand lever 21 may be made of pressed steel, the two sides 23 and 24 of which near the pivoted end thereof being spaced apart to permit relative motion between said hand lever and ratchet 15. The extreme ends 25 and 26 of the sides 23 and 24, respectively, are offset relatively to ratchet 15 to pass over the outside of levers 17 so that hand lever 21 may be pivoted at 20 on levers 17. The offsets form shoulders 27, 28 on lever 21, which limit the clockwise rotation of lever 21 about levers 17. Thus, hand lever 21 may be rotated clockwise about pivot 20 until shoulders 27, 28 abut levers 17, whereupon further clockwise rotation of lever 21 is possible only about pivot 16 and in unison with levers 17.

Pivoted at 29 on hand lever 21 is a pawl 30 which is biased in the direction of pivot 16 by a helical spring 31. Said spring 31 is secured to hand lever 21 at a point 32 such that the axis of the spring is approximately on a line connecting point 32 and pivot 16. Pivot 29 and point 32 are so chosen that when hand lever 21 has been rotated clockwise about pivot 20 to the limit of its travel (i. e. when shoulders 27, 28 abut levers 17) pawl 30 will be rotated so that the area of contact between the pawl and the teeth lies slightly below a line connecting pivots 29 and 20. Nose 33 of pawl 30 is therefore made blunt and the cooperating portions 34 of teeth 16' are likewise squared off perpendicularly to the aforementioned line between pivots 29 and 20 to minimize any tendency of pawl 30 to rotate about pivot 29 through dead center. Continued rotation beyond dead center is prevented by the friction between the pawl and teeth assisted by spring 31.

It is obvious now, that when hand lever 21 is pulled up to actuate the brake, the tension of pull cable 10 is transmitted through levers 17 to pivot 20, and through pivot 20 radially outward to pivot 29. If the area of contact between pawl 30 and teeth 16' always lies below this radius, then the brake is always locked when it is pulled up. It is likewise obvious that to release the brake, all that is necessary is to rotate pawl 30 counterclockwise through dead center.

Considering the relative lengths of the distances between pivots 29 and 20, and pivots 29 and 16, it is clear that a small counterclockwise rotation of hand lever 21 about pivot 20 will move the area of contact between nose 33 of pawl 30 and portion 34 of ratchet teeth 16' past dead center, and that the radial pull through pivot 20 will thereafter augment the displacement from dead center until the nose of the pawl has been rotated to the left of the line connecting pivots 29 and 16, whereupon the pawl will cease to offer any appreciable resistance to the release of the brake. The counterclockwise rotation of lever 21 increases the distance between pivot 29 and pivot 16 so that pawl 30 can be made to clear ratchet teeth 16' in its motion to the right to effect the release of the brake.

In view of the relatively long hand lever 21 and the shortness of the pawl, a very large mechanical advantage is available to rotate the pawl off dead center. The amount of force required at the end of hand lever 21 to effect this rotation is therefore very small. Furthermore, it is entirely unnecessary to pull hand lever 21 prior to releasing the brake, since this would only serve to lock the brake still more tightly.

The operation of the brake may be summarized as follows:

Handle 44 of lever 21 is grasped and pulled to the left until sufficient force has been applied to operate the brake. The first part of the leftward movement serves to rotate lever 21 clockwise about pivot 20 on short levers 17 until shoulders 27, 28 abut said levers 17. Such clockwise motion of lever 21 also brings pawl 30 into engagement with teeth 16 and rotates said pawl to dead center position. The remainder of the leftward movement causes levers 21 and 17 to move as a single unit about pivot 16, with pawl 30 ratcheting over teeth 16' against the pull of spring 31. In its fully pulled-up position, the tension in cable 10 is balanced by the reaction of teeth 16' against nose 33 of pawl 30.

To release the brake, a slight force is applied to the back of handle 44 until the lever snaps back to the right to released position, i. e., until levers 17 are stopped by detent 45 on bracket 13. The first part of the movement to the right causes lever 21 to rotate counterclockwise about pivot 20, which also permits pawl 30 to move counterclockwise about its pivot 29 past dead center, under the action of spring 31. The tension in cable 10, plus the force exerted on hand lever 21, causes a continued counterclockwise rotation of pawl 30 through the dead center position of the pawl with respect to spring 31, until nose 33 points to the left. In the remaining portion of the motion to the right, the tension in cable 10 will pull the entire assemblage to the right with pawl 30 sliding over teeth 16' until levers 17 are stopped by detent 45, whereupon the momentum of lever 21 will swing said lever about its pivot 20 and remove pawl 30 completely from teeth 16'. Pawl 30 will then assume the neutral position shown in Fig. 1.

If the tension in wire 10 is not sufficient to pull the levers to their extreme right-hand position, the neutral position of pawl 30 can be assured by pushing lever 21 to the right to the limit of its travel in that direction prior to each application of the brake.

For some installations it may be desirable to provide against an accidental release of the brake. This may be done by forming a detent 35 on the end of lever 17, and providing a pivoted latch 36 on hand lever 21, with spring means 37 normally urging latch 36 into engagement with detent 35. Thus, when hand lever 21 is pulled up to actuate the brake, said lever rotates about pivot 20 which causes latch 36 to be pulled over detent 35 until the two are engaged. The point of engagement occurs just before shoulders 27, 28 engage levers 17. Since pawl 30 cannot be rotated through dead center unless lever 21 can rotate about pivot 20, locking lever 21 against rotation with respect to levers 17 effectively prevents the release of the brake unless latch 36 is released. Latch 36 may be provided with an extension 46 which cooperates with the tail 30' of pawl 30 to prevent the operation of the latch when pawl 30 is in reversed position.

The actual mechanism for releasing latch 36 may be made a part of spring means 37 for engaging the latch. Thus, spring 37 may be a wire having a bend at 39 and a portion 40 which protrudes beyond the handle portion 41 of hand lever 21. The wire may be wrapped around a pin 42 in lever 21 and the end opposite latch 36 may be anchored in corner 43 of the lever. Squeezing portion 40 against the lever will cause the portion on the opposite side of pin 42 to rotate clockwise to release latch 36. Protruding portion 40 of wire 37 is preferably located some distance from the free end 44 of hand lever 21 so as not to interfere with the operation of the brake.

Although the various pivots have not been described in detail, it is understood that any of the standard means for providing a pivoted connection between two members may be employed.

The lever system described is relatively simple and requires the addition of but one link over lever systems heretofore used in such applications. The ratchet and pawl, although of novel design, are nevertheless readily made. Although the load is taken by the pawl and ratchet as before, it is unnecessary to apply a counter load of equal magnitude to release the pawl, but only sufficient force to overcome the friction between the pawl and ratchet. Because of the great mechanical advantage obtained through the lever system, the actual force required to manipulate the pawl is very small. For some installations the safety latch may be omitted. In the cases where its use is deemed necessary, the safety latch does not unduly complicate the mechanism, nor does it require a large force for its operation. The latch does not carry the load of the brake tension, and hence is readily manipulated.

In addition to the improved operation of the brake, it will be noted that the majority of the component parts of the brake can be made from steel stampings.

It is understood that the foregoing description is merely illustrative of one application of this invention, and that the scope of the invention therefore is not to be limited thereto, but is to be determined by the following claims.

I claim:

1. A ratchet, a pawl adapted to cooperate therewith, a pivot for said pawl, a lever pivoted at the center of curvature of the ratchet, a second lever pivoted on said first lever and supporting the pivot for said pawl, means urging the first lever in one direction, said pawl when moved past dead center in the opposite direction becoming locked against the ratchet, said second lever being adapted to move in the same direction as the first lever urging means to shift the pivot of the pawl, whereby said pawl is rotated through dead center position and released, latching means for preventing the shifting of the pivot of the pawl to release said pawl, and means on said pawl cooperating with the latching means, whereby to maintain said latching means in unlatched condition when it is desired to maintain said pawl in released position.

2. Apparatus as described in claim 1, said means for preventing the shifting of the pivot of the pawl comprising a pivoted latch and means normally urging the latch to engaged position whereby the pivoted pawl is maintained in locked position.

3. Apparatus as described in claim 1, said means for preventing the shifting of the pivot of the pawl comprising a pivoted latch, means normally urging the latch to engaged position, and means on said second lever for disengaging said latch, said latch disengaging means being operable from a point adjacent the lever operating region.

4. Apparatus as described in claim 1, said means for preventing the shifting of the pivot of the pawl comprising a pivoted latch, means normally urging the latch to engaged position, and means on said latch cooperating with the pawl to maintain said latch in disengaged position when said pawl is in released position.

5. A pivoted lever, a second lever pivoted on the first lever, an extension on said second lever adapted to contact said first lever to limit relative rotation therebetween, a fixed ratchet, a pawl on said second lever cooperating with said ratchet, said pawl being in a position to lock against said ratchet when the second lever is rotated relative to the first lever substantially the maximum amount permitted by the extension and in a released position when the second lever is rotated relative to the first lever in the opposite direction, an automatically operable pivoted latch for preventing rotation of said second lever in said opposite direction subsequent to rotation of said lever to locking position, and means on said latch cooperating with the pawl whereby said latch is made ineffective to prevent relative rotation between the levers after it has been released and while said pawl is in released position.

STUART H. CALDWELL.